US009514422B2

(12) United States Patent
Argue et al.

(10) Patent No.: US 9,514,422 B2
(45) Date of Patent: Dec. 6, 2016

(54) VIRTUAL QUEUE FOR A LINE AT A RETAIL STORE

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 0 days.

(21) Appl. No.: 14/314,921

(22) Filed: Jun. 25, 2014

(65) Prior Publication Data

US 2015/0379434 A1    Dec. 31, 2015

(51) Int. Cl.
*G06F 17/00* (2006.01)
*G06K 15/00* (2006.01)
*G06Q 10/02* (2012.01)
*G06Q 30/06* (2012.01)
*G06Q 50/12* (2012.01)

(52) U.S. Cl.
CPC .......... *G06Q 10/02* (2013.01); *G06Q 30/0633* (2013.01); *G06Q 50/12* (2013.01)

(58) Field of Classification Search
CPC .... G06Q 10/02; G06Q 10/06; G06Q 30/0633; G06Q 50/12
USPC ................................................. 235/375, 383
See application file for complete search history.

(56) References Cited

U.S. PATENT DOCUMENTS

| | | |
|---|---|---|
| 6,529,786 B1 | 3/2003 | Sim |
| 6,845,361 B1 * | 1/2005 | Dowling ........................... 705/5 |
| 7,720,718 B2 | 5/2010 | Hale |
| 7,752,146 B2 | 7/2010 | Lert, Jr. |
| 8,135,612 B1 | 3/2012 | Scudder |
| 8,200,515 B2 | 6/2012 | Natsuyama |
| 8,214,241 B2 | 7/2012 | Kaiser |
| 8,510,163 B2 | 8/2013 | Hess |
| 2004/0059614 A1 * | 3/2004 | Brown ............... G06Q 30/0281 705/346 |
| 2008/0133283 A1 | 6/2008 | Backer |
| 2009/0076875 A1 * | 3/2009 | Lert et al. .......................... 705/8 |
| 2009/0089183 A1 * | 4/2009 | Afram et al. .................... 705/27 |
| 2009/0325629 A1 | 12/2009 | Snyder |
| 2010/0015993 A1 * | 1/2010 | Dingler et al. ............. 455/456.1 |
| 2010/0169147 A1 | 7/2010 | McCormack |
| 2011/0178960 A1 | 7/2011 | Dever |
| 2011/0307547 A1 | 12/2011 | Backer |
| 2011/0314417 A1 * | 12/2011 | Allen ............................ 715/810 |
| 2012/0158934 A1 | 6/2012 | Xiao |
| 2012/0221665 A1 * | 8/2012 | Lee et al. ....................... 709/207 |
| 2012/0284122 A1 | 11/2012 | Brandis |
| 2012/0315868 A1 | 12/2012 | Ben-Alexander |
| 2013/0103486 A1 * | 4/2013 | Hess ..................... G06Q 30/02 705/14.38 |
| 2013/0223678 A1 | 8/2013 | Brunetti |

* cited by examiner

*Primary Examiner* — Laura Gudorf
(74) *Attorney, Agent, or Firm* — Howard & Howard Attorneys PLLC

(57) ABSTRACT

A computer-implemented process can be operated for entering and holding a place for a first customer in a queue while the first customer is waiting to be served at a retail store. The process includes, within a computerized processor, establishing a place in the queue for the first customer, wherein the queue operates to establish among a plurality of customers a customer currently being served by a store employee and an order in which other customers of the plurality will be served. The process further includes displaying upon a portable computerized device of the first customer an indication of a status of the first customer within the queue.

9 Claims, 4 Drawing Sheets

VIRTUAL QUEUE FOR A LINE AT A RETAIL STORE

BACKGROUND INFORMATION

Field of the Disclosure

The present disclosure relates generally to providing a process for a customer to electronically hold a place in a line during a shopping trip in a retail store. More particularly, the disclosure includes a process to display the estimated waiting time and the number of people ahead of the customer on the customer's portable computerized device.

Background

According to one embodiment of a process to queue customers in a deli or counter-served restaurant, customers arrive at a counter and select a printed number from a ticket machine that sits on the counter top. The customer must patiently wait until his or her particular number is called, and then proceed to the clerk and present the printed ticket, and then he or she is served. If the customer happens to be pressed for time, the customer may skip the counter altogether or alternatively, wait at the counter but miss other shopping opportunities elsewhere in the store. Customers may opt for a delivery service, but then the store misses the opportunity to have the customer in the retail store environment where the customer may be exposed to additional product to purchase.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
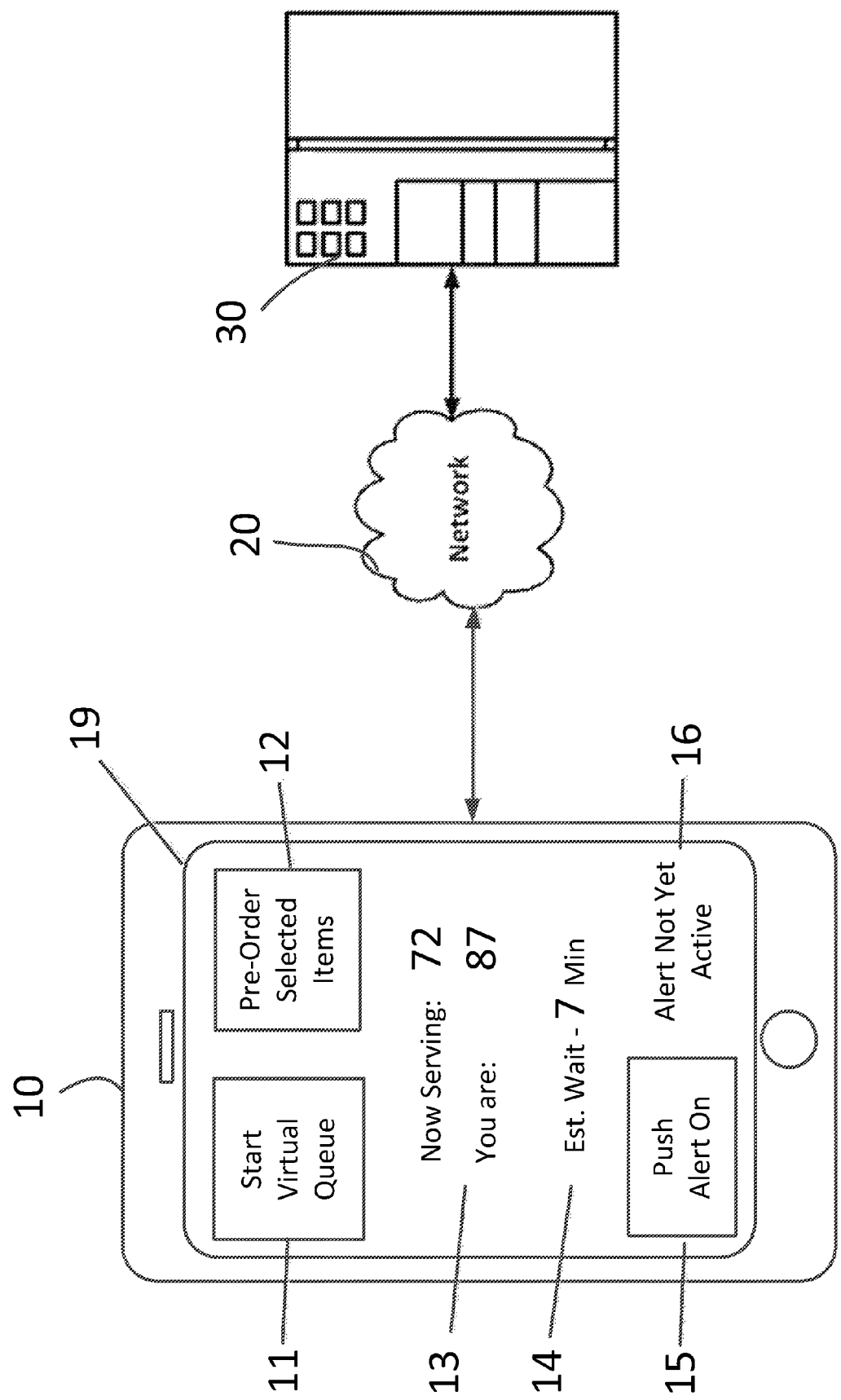
FIG. 1 is a schematic illustrating an exemplary portable computerized device displaying a customer's queue place in communication with a server via a network, according to some embodiments of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or processes have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Customers at a store can shop at a deli, wherein lunchmeats, prepared salads, soups, and other prepared foods are made available, either for the customer to take home or to eat in the store. Similarly, a large retailer can provide a counter for a restaurant chain to establish service within the large store, such that shoppers can take a break from shopping to eat a prepared meal. Throughout the disclosure, processes are disclosed in relation to a deli counter or a deli line, but it will be appreciated that the processes disclosed could be employed in any situation wherein customers must wait in line, including but not limited to a restaurant, a seafood counter, a meat counter, an automotive service counter, and a mobile phone service and sales counter.

An individual shopper wishes to achieve a faster shopping experience by avoiding a wait in a deli line, but still maintaining his or her place in line at the deli counter. In one exemplary embodiment, a shopper can use a portable computerized device, such as a smart phone, a tablet computer, or head mounter display (HMD) glasses that are configured to operate a software application, which enables a process to hold a virtual place in a line or queue. The shopper can enter request to be added to a queue by selecting or activating a virtual queue application on his or her portable computerized device. In another embodiment, the request to enter a queue may be part of a larger application aiding the customer in shopping, for example, a program tending to an electronic shopping list. The request to be added to a queue can initiate a new screen on the shopper's portable computerized device. The device communicates with a computerized remote server operated by the store or by a chain of stores associated with the present store. By operating a computerized queue for customers seeking service from the deli counter and communicating information between the portable computerized device of the customer and the server, the customer can be permitted to be actively within the service queue without being physically present at the counter.

A process can be operated to prompt a customer in the queue to return to the counter when his or her number is being called or at some time in advance of the number being called. The warning can be generated according to a number of criteria. In one example, a warning can be issued when the number of the customer in front of the customer operating the queue application is called. In another embodiment, a number of workers serving customers at the counter can be taken into account. For example if three workers are serving customers, then the warning the customer operating the queue application can be issued when a customer three numbers ahead has been called. A set warning interval based upon time can be selected, for example, two minutes ahead of an estimated time when the customer's number would be called. Such a two minute estimate can be made based upon a programmed calibration, based upon historical times at the counter, based upon a worker adjustable parameter, or by other processes to estimate a warning time interval.

According to one embodiment, in determining a desired warning interval, a complexity of orders entered for other customers ahead of the customer operating the queue application can be taken into account. For example, if two people ahead of the customer have ordered only self-serve soft drinks, the people are likely to be served and their orders completed quickly. A brief warning interval can be set. If a person ahead of the customer has ordered a party tray to serve thirty people, then the order is likely to take a long time to fill. A longer warning interval can be set. Order complexity can be known for either orders that have presently been placed by people being served. Order complexity can also be known for any customers that have pre-selected items for the counter or pre-ordered. Order complexity can also be estimated or projected. For example, a particular type of order at lunch-time may be common at a particular counter. In another example, a particular customer may have an established shopping history. If Judy tends to continually order items from the deli that require a long time to complete, and Judy is using the queue software, customers behind Judy can include longer warning intervals even though Judy has not yet actually placed an order.

According to one embodiment, the application can include information about a present location of the customer operating the queue application. The server, through location recognition software and hardware disclosed herein and known in the art, can determine that a location of the customer within the store or in an area proximate to the store. A warning interval can be adjusted based upon a location of the customer in relation to the counter. If the customer is thirty feet away from the counter, the interval can be set at one minute. If the customer is on the other side of a large store or stepped out of the store, then the interval can be set at a larger time in order to permit the customer to traverse the large distance. If the customer is too far away for an estimated time until the customer's number is going to be called, the customer can be bumped down the queue. In such an instance, the customer can be notified that the assigned spot in the queue has been lost based upon the location of the customer. The bumped customer can be re-entered at the end of the queue with a new number. In the alternative, the bumped customer can be provided with a new space in the queue between two existing spaces in the queue. A location of the device of the customer can further be used to diagnose if the customer forgot about the queue and left the store. In such an instance, the customer can be prompted whether the order should be retained or whether another action is appropriate.

A customer in the queue can wait until his or her number is called, and then can proceed to identify items to be ordered. In another embodiment, the customer can be provided with a list of items that can be ordered from the deli upon the portable computerized device as a process to pre-order items from the deli. By pre-ordering items, the customer can simply drop by to pick up the items from the counter. In one exemplary embodiment, the pre-ordered items can simply be placed in a holding area with a price sticker already affixed to the item, such that the customer can simply pick up the item and continue on with a checkout process otherwise established for the store. In another embodiment, the application could link the order to an on-line process for providing payment, such as by credit card or by third-party payment services such as PayPal®, and the order can be taken from the store without the customer needing to interact with the workers.

The server can communicate a status to the shopper's portable computerized device, for example, stating that "You are Number XX", and "Now Serving XY". As the deli counter continues to serve customers, it updates this information on the shopper's portable computerized device. Notification from the server to the customer can take many forms, including push notification, text message, a change to the display of the application running upon the customer's device, or by any other process known in the art.

Various embodiments of virtual queuing and pre-order and rapid service menu processes are envisioned. A number of examples are illustrated, but the disclosure is not intended to be limited to the particular examples provided herein Referring now to FIG. 1, a portable computerized device is illustrated in communication with a remote server. In some embodiments, as shown in the illustrative example, the portable computerized device 10 is displaying a graphical user interface (GUI) 19 configured as a touch screen device that is displaying a "Start Virtual Queue" button 11, a queue number status indication 13, an estimated waiting time 14, and an alert status message 16. Device 10 and server 30 communicate through wireless network 20. In some embodiments, a "Pre-order Selected Items" button 12 can optionally be provided. A button 15 to toggle a push alert on/off when a warning interval has run can also be provided.

GUI 19 presents to the customer a "Start Virtual Queue" button 11. Selecting this connects the user's portable computerized device 10 in direct communication with the store's remote server 30. The remote server 30 then enters the shopper into a virtual queue and communicates information to the device 10 based upon operation of the queue. The device 10 can change displays based upon communication from the server 30, and additionally or alternatively the device 10 can vibrate or issue an audio indication.

Figure 2:
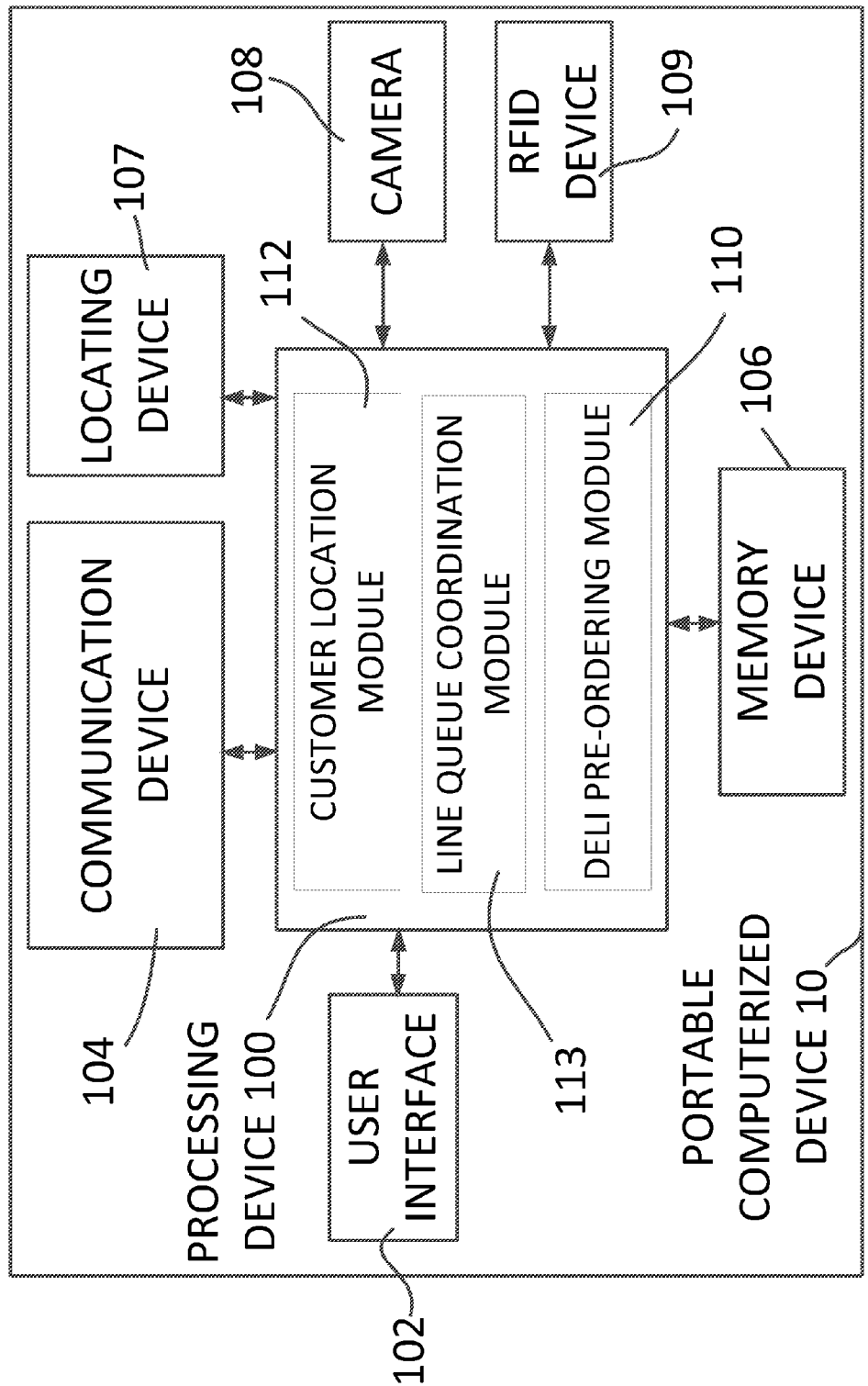
FIG. 2 is a schematic illustrating exemplary components of the portable computerized device of FIG. 1, according to some embodiments of the present disclosure.

FIG. 2. a schematic illustrating exemplary components of the portable computerized device of FIG. 1 is illustrated. In the illustrative embodiment, the portable computerized device 10 includes a processing device 100, a user interface 102, communication device 104, a memory device 106, a locating device 107, a camera device 108, and a Radio Frequency Identification Device (RFID) 109. It is noted that the portable computerized device 10 can include other components and some of the components are not always required.

The portable computerized devices of the present disclosure can include non-limiting examples of a smart phone device, a tablet computer, a processor equipped pair of HMD eyeglasses configured to project graphics upon a view of the wearer, or any other similar computerized device capable of operating the processes disclosed herein.

The processing device 100 can include memory, e.g., read only memory (ROM) and random access memory (RAM), storing processor-executable instructions and one or more processors that execute the processor-executable instructions. In embodiments where the processing device 100 includes two or more processors, the processors can operate in a parallel or distributed manner. The processing device 100 can execute the operating system of the portable computerized device 10. In the illustrative embodiment, the processing device 100 also executes a deli pre-ordering module 110, a customer location module 112, and a line queue coordination module 113, which are described in greater detail below.

User interface 102 is a device that allows a user to interact with the portable computerized device 10. While one user interface 102 is shown, the term "user interface" can include, but is not limited to, a touch screen, a physical keyboard, a mouse, a microphone, and/or a speaker. The communication device 104 is a device that allows the portable computerized device 10 to communicate with another device, e.g., the remote server 30, via the network 20.

The communication device 104 can include one or more wireless transceivers for performing wireless communication and/or one or more communication ports for performing wired communication.

The memory device 106 is a device that stores data generated or received by the portable computerized device 10. Memory device 106 can include, but is not limited to, a hard disc drive, an optical disc drive, and/or a flash memory drive.

The locating device 107 determines a location of the portable computerized device 10 according to processes known in the art. According to one embodiment, locating device can include an real-time locating system (RTLS) device, for example, utilizing cell phone tower signals to determine a location of the device.

The camera 108 is a digital camera that captures a digital photograph. Camera 108 receives an instruction to capture an image, captures an image of an object, i.e., a barcode on a deli counter ticket, and outputs the digital photograph. The digital photograph can be a bitmap, a JPEG, a GIF, or any other suitably formatted file. The camera 108 can receive the instruction to capture the image from the processing device 100 and can output the digital photograph to the processing device 100. According to one embodiment, the deli counter can provide a display with items that can be ordered, and each item can have a barcode associated with the item, such that a customer operating the queue application can add an item to an order by scanning the barcode.

An pre-order or the list of items pre-ordered by the customer can be changed through some interval. For example, if the workers are still helping other customers in front of the customer making the pre-order, items can be added or deleted. Once the order has been started, the workers or software operated by the store can block items from being deleted or changed within the pre-order. In one embodiment, a registered account by the customer can be required to limit losses by the store of customers failing to pick up ordered goods.

The Radio Frequency Identification Device (RFID) 109 can determine proximity of device 10 to items marked with an RFID chip. In one embodiment, a store can have RFID chips located at known way stations throughout the store or even just one, at the deli counter, that determine where a shopper is located.

The line queue coordination module 113 includes programming to coordinate with server 30 to determine and display customer information upon GUI 19. Module 113 can include, for example, information estimating a time that the customer will take to get to the counter or can include information about past orders placed by the customer.

Customer location module 112 can access information from locating device 107 and data from server 30 including information about the location of the device of the customer to provide information enabling the server to locate the customer intending to use the virtual queuing service. Such information regarding the relative location of the customer to the deli counter can be presented according to a number of exemplary embodiments.

Deli pre-ordering module 113 receives information from server 30 and can provide information to the shopper's portable computerized device regarding what items the customer has ordered in the past, daily specials, and a regular menu of popular items that can easily be sold. Module 113 can provide authentication data to the server, establishing the identity of the customer and can provide processes to provide payment for the order or pre-order.

Embodiments in accordance with the present disclosure may be embodied as an device, process, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied an any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 3:
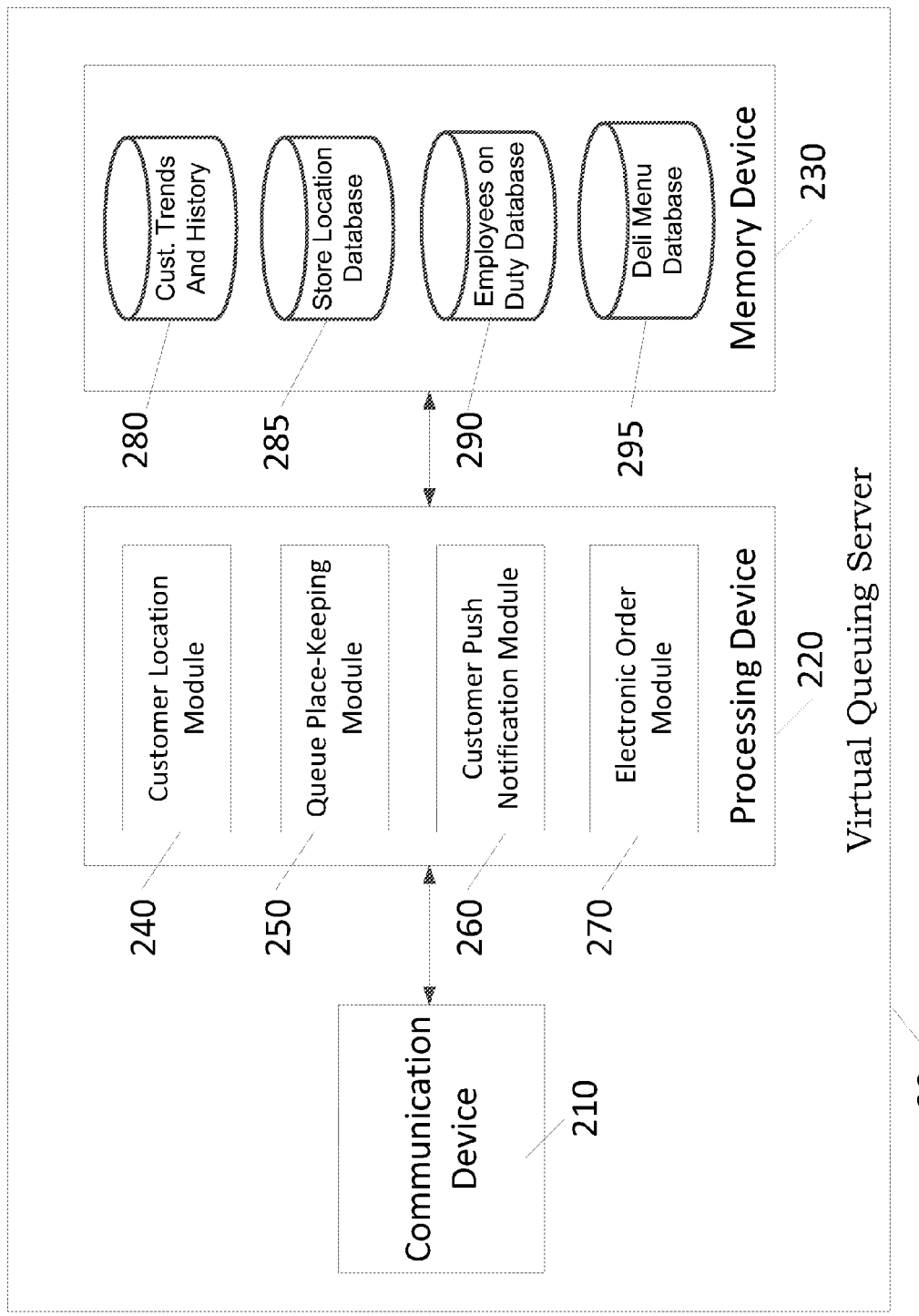
FIG. 3 is a schematic illustrating exemplary components of a virtual queuing server, according to some embodiments of the present disclosure.

FIG. 3 is a schematic illustrating a remote server acting as an exemplary virtual queuing server. In the illustrated embodiment, remote server 30 may include a processing device 220, a communication device 210, and memory device 230.

The processing device 220 can include memory, e.g., read only memory (ROM) and random access memory (RAM), storing processor-executable instructions and one or more processors that execute the processor-executable instructions. In embodiments where the processing device 220 includes two or more processors, the processors can operate in a parallel or distributed manner. In the illustrative embodiment, the processing device 220 executes one or more of a customer location module 240, a queue place-keeping module 250, a customer push notification module 260, and an electronic order module 270.

The communication device 210 is a device that allows the remote server 30 to communicate with another device, e.g., a portable computerized device through a wireless communication network connection. The communication device 210 can include one or more wireless transceivers for performing wireless communication and/or one or more communication ports for performing wired communication.

The memory device 230 is a device that stores data generated or received by the remote server 30. The memory device 230 can include, but is not limited to a hard disc drive, an optical disc drive, and/or a flash memory drive. Further, the memory device 230 may be distributed and located at multiple locations. The memory device 230 is accessible to the processing device 220. In some embodiments, the memory device 230 includes a customer trends and history database 280, a store location database 285, an employees-on-duty database 290, and a deli menu database 295.

In some embodiments, the customer trends and history database 280 stores information about a shopper's past purchases, including quantities and specific types so that the virtual queuing server can utilize this data to better estimate how much time other shoppers ahead of another shopper might spend. Customer trends such as the average amount purchased and the time spent can vary by the time of day, day of the week, and special holidays. Store location database 285 works in conjunction with the RTLS locating device or strategically located RFID chips via the network and the customer location module 240 so the shopper's location is known. When the shopper's turn in the queue is announced, and the server determines that the shopper is at the far end of the store instead of at the deli, it can automatically place the shopper back in the queue without upsetting the shopper by dismissing the shopper's turn. The employees on duty database 290 provides important staffing information that allows the server to know how many employees are available to serve shoppers and therefore how fast serving lines will move. The deli menu database 295 contains a listing of all items available at the deli. Information can include items available, prices, daily specials, sales, and a menu of popular items that can be chosen by a shopper by the pre-order selected items button 12 on a shoppers portable computerized device.

The customer location module 240 monitors and receives constant updates about the whereabouts of a shopper so that his or her proximity to the deli counter is known. This information can update a shopper's place in a virtual queue if the shopper misses his or her arrival time. In one embodiment, knowing the shopper's location can be a requirement to even use the virtual queue or a function button such as pre-order selected items 12. The proximity to the deli counter can be set as close as a few feet to as far as the parking lot or even further.

Queue place-keeping module 250 keeps track of all current deli shoppers and their place in the queue. As one shopper finishes, each waiting shopper moves up in the queue, as the "now serving X" number changes. In one embodiment, the estimated waiting time 13 display on the shopper's portable computerized device is also updated. In another embodiment, the alert message to the customer's device can be activated at the appropriate time by queue place-keeping module 250.

Customer push notification module 260 is activated, for example, by module 250 to provide the shopper with a warning prior to the shopper's turn at the deli counter. In one embodiment, a light on the shopper's portable computerized device will flash. In another embodiment, the shopper's portable computerized device will vibrate of ring, alerting the shopper that he or she should go to the deli counter.

Electronic order module 270 can query database 295 and provide a shopper with a list items available at the counter that can be pre-ordered. In one embodiment, a list of current store specials that may be of interest to the shopper can be provided. Customers using the queue application can be incentivized to use the application by providing "queue application only coupons" to the customers. In one embodiment, by querying database 280, module 270 can better select which specials or menu items are more likely to be of interest to the shopper. Module 270 can further track and provide pre-orders for various customers and can provide the information to the store workers, for example, by providing a video feed of current orders and future orders or by printing order tickets. Such printed tickets can, in some instances where the item does not need to be weighed in order to determine a price, include pre-made price stickers that the worker can adhere to the product.

Figure 4:
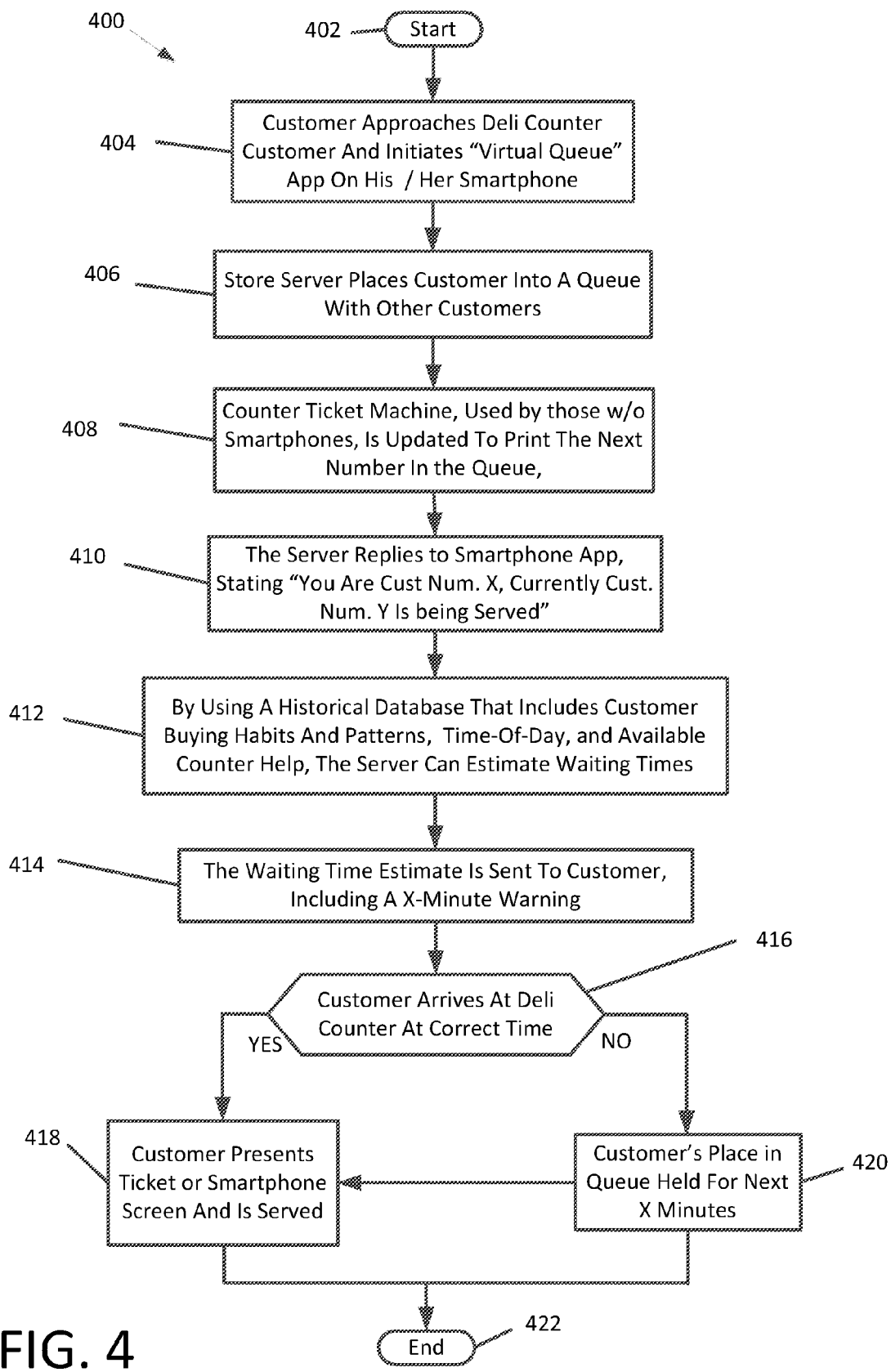
FIG. 4 illustrates a flowchart for an exemplary process for a virtual queuing server according to some embodiments of the present disclosure.

FIG. 4 illustrates a flowchart 400 for an exemplary process for a shopper to initiate a virtual queue process on a smartphone. Embodiments in accordance with the present disclosure can include non-limiting examples of a smart phone device, a tablet computer, a processor equipped pair of eyeglasses configured to project graphics upon a view of the wearer, or any other similar computerized device capable of operating the processes disclosed herein Flowchart 400 begins at step 402. At step 404, the customer, approaches the deli counter and initiates the "virtual queue" application on his smart phone to begin the process. Next, at step 406, the store server placed the shopper into a virtual queue with other shoppers, both those present with a paper ticket and those who are ahead in the virtual queue who entered electronically. At step 408, the deli counter ticket machine is updated so the next paper ticket that it prints will be the next number in the queue. At step 410, the server responds to the smartphone application with a message indicating a queue number of a customer currently being served and/or a queue number of the customer, e.g. "Now Serving X, You Are Y." At step 412, the server uses historical shopper data, including individual shopper history, the time of day, the available deli counter staff, and other trends to estimate the waiting time for each shopper in the virtual queue. At step 414, the server sends this estimated waiting information to the smartphone of the waiting shopper, and periodically updates it. This step includes a "X" minute warning that the server sends to the shopper prior to the scheduled time. Step 416 is the scheduled time for the shopper to be at the deli counter. At step 418 the shopper shows his or her smartphone screen or presents his or her paper ticket, and is served. At step 420, if the shopper is delayed, the deli has the option of "bumping" the shopper back in the queue so that the shopper does not lose his or her place. If and when the customer finally does arrive, he or she then follows step 418. Process 400 ends at step 422.

The flowchart and block diagrams in the flow diagrams illustrate the architecture, functionality, and operation of possible implementations of systems, processes, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing device to function in a particular manner, such that the instructions stored in the computer-readable medium produce an article of manufacture including instruction means which implement the function/act specified in the flowchart and/or block diagram block or blocks.

The processes disclosed herein are exemplary but not intended as limiting examples of an indication of a status that can be provided to a customer within a queue. For example, a display of a current queue number being served can be provided to the customer. In another embodiment, only an estimated time until the customer will be served will be displayed. In another embodiment, a simple vibration of the device and or a flashing display can be used to indicate to the customer a status of his or her place in the queue.

The processes disclosed herein could similarly be operated outside of a retail store. For example, a doctor's office could maintain a server including the appointments that are scheduled for the day. If the doctor is behind in schedule, a patient could be notified through a portable computerized device that he or she can show up to the doctor's office twenty minutes late. If the device of the patient is located to be thirty minutes from the doctor's office five minutes before the scheduled time of the appointment and another patient is already waiting at the office, the server can automatically swap the appointment times to avoid the negative impact to the doctor's schedule. Similar servers could be operated by a veterinarian's office, a department of motor vehicles office, a lawyer's office, or any office where people wait in a line or are scheduled to appear in a particular order through a day.

The above description of illustrated examples of the present disclosure, including what is described in the Abstract, are not intended to be exhaustive or to be limitation to the precise forms disclosed. While specific embodiments of, and examples for, the disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A computer-implemented process for entering and holding a place for a first customer in a queue while waiting to be served at a retail store, the process comprising:
   providing a server for the retail store in communication with a portable computerized device of the first customer;
   providing a virtual queue application for the portable computerized device to be initiated by the first customer;
   displaying to the first customer a list of items that can be pre-ordered from the retail store and accepting a pre-order from the first customer through the portable computerized device of the first customer, the pre-order comprising items that the first customer wishes to purchase when the first customer is served by a store employee;
   establishing, by the server, a place in the queue for the first customer, wherein the queue operates to establish among a plurality of customers a customer currently being served by the store employee and an order in which other customers of the plurality of customers will be served;
   monitoring, by the server, a current location of the portable computerized device of the first customer;
   using, by the server, historical shopper data, including individual shopper history, time of day, and available store employees to estimate a waiting time for each customer in the virtual queue;
   estimating, by the server, a wait time until the first customer is likely to be served;
   determining, by the server, a warning interval describing a scheduled time that the first customer should arrive;
   sending, by the server, a push notification of a warning based on the warning interval to a portable computerized device of the first customer prior to the scheduled time for the first customer to arrive;
   displaying, by the server upon the portable computerized device of the first customer, an indication of a status of the first customer within the queue based upon the current location of the first customer including a queue number of the first customer and the customer currently being served and the estimated wait time;
   determining if the first customer arrived at the scheduled time;
   if the first customer is delayed, holding the place of the first customer in the queue for a predetermined time; and
   if the predetermined time has passed, bumping the first customer to a later place in the queue based upon the current location of the portable computerized device of the first customer.

2. The computer-implemented process of claim 1, wherein estimating the wait time is based upon a portion of the plurality of customers ahead of the first customer in the queue.

3. The computer-implemented process of claim 1, wherein estimating the wait time is based upon a number of the store employees serving the plurality of customers.

4. The computer-implemented process of claim 1, wherein estimating the wait time is based upon items being ordered by the plurality of customers ahead of the first customer in the queue.

5. The computer-implemented process of claim 1, wherein estimating the wait time is based customer order tendencies for a current time of day.

6. The computer-implemented process of claim 1, further comprising:
   with the portable computerized device of the first customer, providing for payment of the pre-order.

7. A computerized server with programming enabling operation a queue for a plurality of customers waiting to be served at a retail store, the server comprising:
   an electronic order module displaying to a first customer a list of items that can be pre-ordered from the retail store and accepting a pre-order by the first customer of items that the first customer wishes to purchase;
   a queue place-keeping module configured to assign the first customer a place in the queue for the first customer, wherein the queue operates to establish among a plurality of customers a customer currently being served by a store employee and an order in which other customers of the plurality of customers will be served;
   a customer location module configured to monitor a current location of the portable computerized device of the first customer;

the queue place-keeping module being configured to use historical shopper data, including individual shopper history, time of day, and available store employees to estimate a waiting time for each customer in the virtual queue and estimate a wait time until the first customer is likely to be served;

the queue place-keeping module being configured to determine a warning interval describing a time that a message should be displayed to the portable computerized device of the first customer;

a communication device including a customer push notification module being configured to send a push notification of a warning based on the warning interval to a portable computerized device of the first customer prior to the scheduled time for the first customer to arrive, provide a message to the portable computerized device of the first customer based upon the place in the queue an indication of a status of the first customer within the queue based upon the current location of the first customer including a queue number of the first customer and the customer currently being served and the estimated wait time; and wherein the queue-keeping module being configured to determine if the first customer arrived at the scheduled time and if the first customer is delayed, to hold the place of the first customer in the queue for a predetermined time and if the predetermined time has passed to bump the first customer to a later place in the queue based upon the current location of the portable computerized device of the first customer.

8. One or more non-transitory computer-readable storage media, having computer-executable instructions embodied thereon, wherein when executed by at least one processor on a portable computerized device of a customer wishing service at a counter in a retail store, the computer-executable instructions cause the processor to operate to:

display to a first customer a list of items that can be pre-ordered from the retail store and accepting a pre-order from the first customer through the portable computerized device of the first customer, the pre-order comprising items that the first customer wishes to purchase when the first customer is served by a store employee;

establish a place in the queue for the first customer, wherein the queue operates to establish among a plurality of customers a customer currently being served by the store employee and an order in which other customers of the plurality of customers will be served;

monitor a current location of the portable computerized device of the first customer;

use historical shopper data, including individual shopper history, time of day, and available counter staff to estimate a waiting time for each customer in the virtual queue;

estimate a wait time until the first customer is likely to be served;

determine a warning interval describing a time that a message should be displayed to the portable computerized device of the first customer;

send a push notification of a warning based on the warning interval to a portable computerized device of the first customer prior to the scheduled time for the first customer to arrive;

display an indication of a status of the first customer within the queue based upon the current location of the first customer including a queue number of the first customer and the customer currently being served and the estimated wait time;

determine if the first customer arrived at the scheduled time;

if the first customer is delayed, hold the place of the first customer in the queue for a predetermined time; and if the predetermined time has passed, bump the first customer to a later place in the queue based upon the current location of the portable computerized device of the first customer.

9. The one or more non-transitory computer-readable storage media of claim 8, further comprising programming to display a message to the customer instructing the customer to return to a deli counter.

\* \* \* \* \*